United States Patent [19]

Dube et al.

[11] Patent Number: 4,654,817
[45] Date of Patent: Mar. 31, 1987

[54] REAL TIME CONTROLLER

[75] Inventors: Carlos M. Dube, Boca Raton; Walter L. Devensky, W. Palm Beach, both of Fla.

[73] Assignee: Allied Corporation, Morristown, N.J.

[21] Appl. No.: 635,311

[22] Filed: Jul. 27, 1984

[51] Int. Cl.⁴ .............................................. G06F 3/00
[52] U.S. Cl. ..................................... 364/900; 364/200
[58] Field of Search ... 364/200 MS File, 900 MS File, 364/428, 429, 453

[56] References Cited

U.S. PATENT DOCUMENTS 4,279,015  7/1981  Edelman et al. ................... 364/200

Primary Examiner—Gareth D. Shaw
Assistant Examiner—Christine M. Eakman
Attorney, Agent, or Firm—Robert M. Trepp; Bruce L. Lamb

[57] ABSTRACT

A real time controller is described for obtaining real time data from a sensor incorporating a memory, comparator, instruction decoder and real time counter. The real time controller solves the problem of gathering real time data as a function of time from a plurality of sensors receiving a plurality of signals.

4 Claims, 2 Drawing Figures

REAL TIME CONTROLLER

BACKGROUND OF THE INVENTION

1. Field of the Invention

This invention relates to apparatus for obtaining real time data from a sensor and more particularly to a programmable real time controller for gathering data independently of a central processing unit which programs the real time controller.

2. Description of the Prior Art

In a microwave landing system, a stationary ground based unit emits signals and operates in conjunction with an airborne receiver which receives and decodes the signals. The decoded signals are fed to instruments used to guide an aircraft during takeoff and landing by supplying angular position information with respect to a selected glide path defined by the ground based unit emitting the signals. Signals received by the airborne receiver include a highly directional microwave beam that scans a covered zone surrounding the runway at a fixed angular velocity. The airborne receiver determines the centroids of the beams as they intercept the aircraft antenna and computes the time differential between the two "scanning beams" to determine aircraft angular position. Preceding these scanning beams, omnidirectional digital data is transmitted from the ground as differentially phase encoded data on an RF carrier. The information received includes function identification and ground status information. Many different signals and formats are sent by the ground base unit transmitter and each require different data handling operations.

The airborne receiver of the microwave landing system includes a central processing unit which is responsible for intercepting the data imbedded in the signals emitted by the ground based unit in real time by way of central processing unit interrupts as well as performing the necessary processing or computation. In optimizing the design of the airborne receiver, the central processing unit was loaded with additional chores, such as more processing of signals, increased function repetition rates, increased data rates, and receiver built-in test (bit) capability. Since interrupts and interrupt handlers are time consuming, it became impractical for the central processing unit to be responsible for the gathering of data from signals emitted by the ground based unit in real time, as well as all of its other chores.

The overhead required by the central processing unit to gather data, in itself, rendered other central processing units unacceptable. Also, the use of the same central processing unit was desirable because it allowed existing software to be implemented. Increasing the central processing unit clock frequency was not desirable because of increased costs associated with higher performance parts and the criticality of keeping high frequency clocks to a minimum in radio frequency (RF) receiving systems.

It is therefore desirable to provide a real time controller which is programmable in order to operate on different signals independently of the central processing unit and to perform operations normally done by the central processing unit in real time, such as clear peak detector, generate tracking gates, store data in real time, switch between antennas, track beams in real time, and synchronize the incoming data to the central processing unit clocks.

It is further desirable to provide a real time controller which may collect data and perform other duties without the help of the central processing unit.

It is further desirable to provide a real time controller which monitors a real time clock and operates on a real time event in response to the time indicated by the real time clock.

It is further desirable to provide a real time controller which generates interrupts to a central processing unit upon completion of its duties.

It is further desirable to provide a real time controller which includes independent memory space for data storage.

It is further desirable to provide a real time controller which includes a direct memory access controller for high volume data, such as beam samples, and to position the data into the central processing unit work space, random access memory (RAM).

It is further desirable to provide a real time controller which may be programmed by a central processing unit in a simplified manner and requiring little time.

It is further desirable to provide a real time controller which includes a storage means for storing data collected from sensors and wherein a central processing unit may independently transfer the data from the storage means to itself.

SUMMARY OF THE INVENTION

An apparatus and method is described for obtaining real time data from a sensor comprising a central processing unit having an arithmetic unit, random access memory, and program memory for storing predetermined constants for controlling said central processing unit, first means for decoding an input signal containing time reference data and function data associated therewith and for generating a START signal in response to the time reference data, a real time counter coupled to the first means for receiving the START signal, said real time counter responsive to the START signal for starting to count from a predetermined value, a comparator having a first input coupled to the real time counter, a memory having a storage space for storing a plurality of words, each word having a predetermined number of bits, a first portion of said bits coupled to a second input of the comparator and a second portion of the bits coupled to an instruction decoder, the instruction decoder having a plurality of output lines, the comparator functioning to compare the first input from the real time clock to the second input from the memory and generating an ENABLE signal and a NEXT signal in response to a comparison, the ENABLE signal coupled to the instruction decoder to enable the instruction decoder to decode the second portion of bits, the NEXT signal coupled to the memory, the memory including means responsive to the NEXT signal for accessing a predetermined word of a predetermined sequence of words.

DESCRIPTION OF THE PREFERRED EMBODIMENT

Figure 1A:
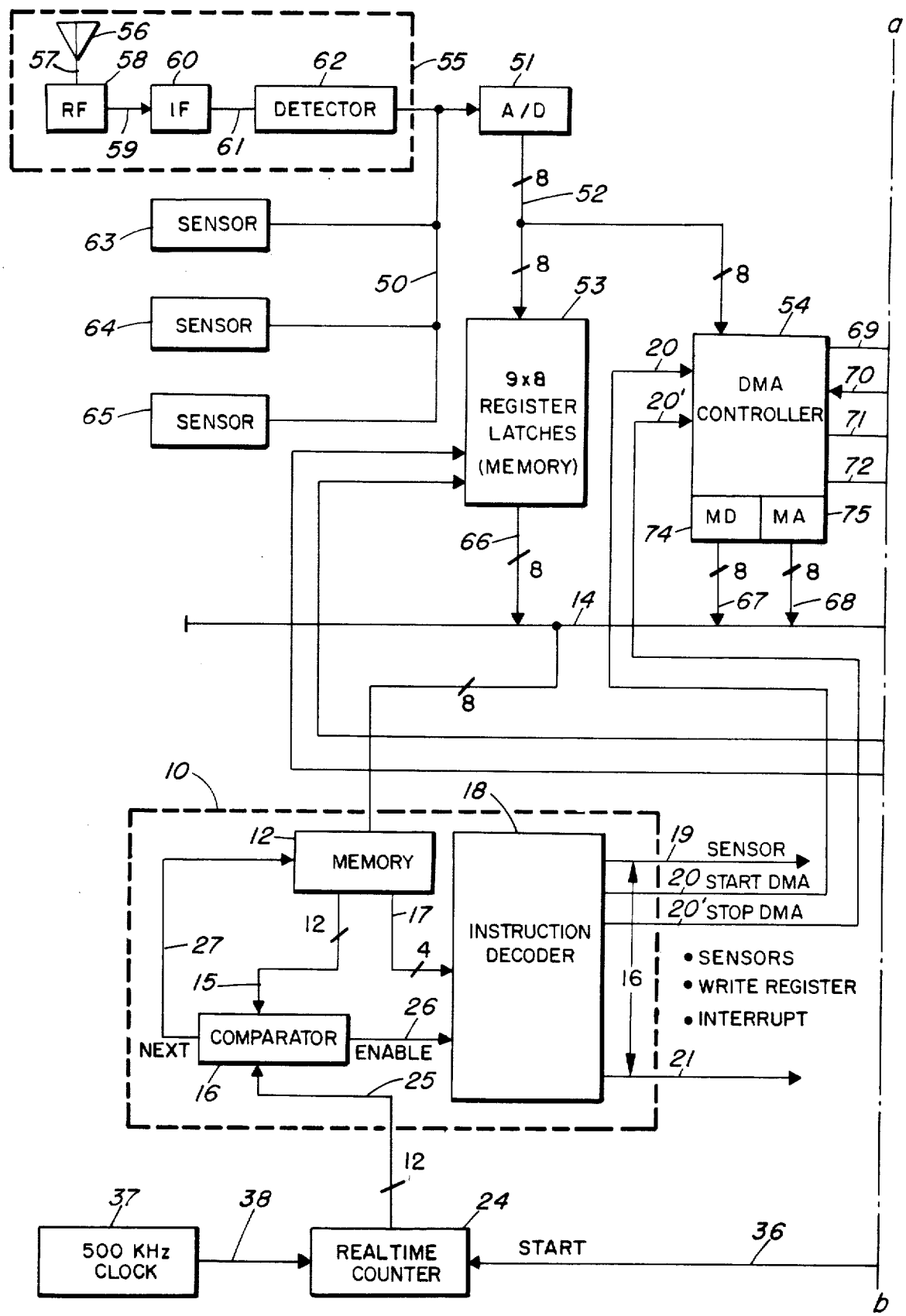
FIGS. 1A and 1B are a schematic diagram of one embodiment of the invention.
Figure 1B:
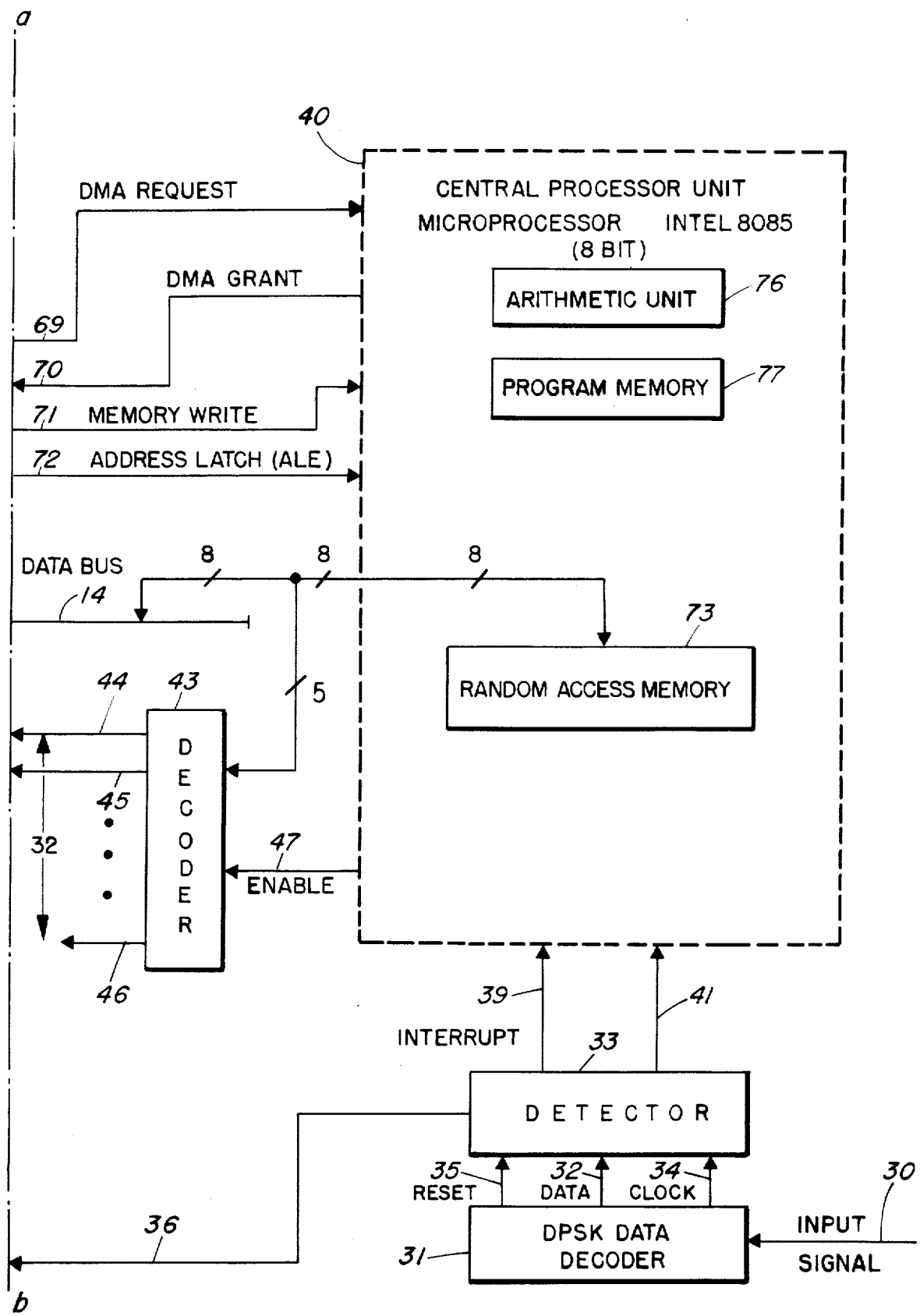

Referring to FIG. 1, a schematic circuit of a real time controller 10 is shown. Real time controller 10 includes a memory 12 which may, for example, be organized as a first in-first out memory having a storage capacity of 20 words by 16 bits. Memory 12 may, for example, be loaded from data bus 14, which is coupled to memory 12. Data bus 14 may, for example, transfer 8 bits in parallel, wherein 16 bits may be transferred by multiplexing on data bus 14. Twelve bits of memory 12 is coupled over line 15 to a first input of comparator 16. Four bits from memory 12 are coupled over line 17 to an input of instruction decoder 18. Instruction decoder 18 functions to decode the 4 bits transferred from memory 12 to provide a plurality of control signals, such as shown by lines 19-21. Table 1 shows one example of 16 instructions which may be decoded by instruction decoder 18 to generate control signals on lines 19-21.

TABLE 1

| Instruction Code | Operation |
|---|---|
| 0 | Clear inside peak detector |
| 1 | Latch amplitude in reg #1 |
| 2 | Latch amplitude in reg 2 |
| 3 | Latch amplitude in reg 3 |
| 4 | Latch amplitude in reg 4 |
| 5 | Latch amplitude in reg 5 |
| 6 | Latch amplitude in reg 6 |
| 7 | Latch amplitude in reg 7 |
| 8 | Latch amplitude in reg 8 |
| 9 | Latch amplitude in reg 9 |
| 10 | Flip antenna switch |
| 11 | Latch DPSK data |
| 12 | Enable DMA (tracking gate up) |
| 13 | Disable DMA (Tracking gate down) |
| 14 | Clear outside peak detector |
| 15 | Generate central processing unit interrupt |

TABLE 2

| | Decoder 43 Operations |
|---|---|
| | Operation |
| 0 | Reset event/Instruction module |
| 1 | Reset interrupt request |
| 2 | Load instruction |
| 3 | Load event time |
| 4 | |
| 5 | |
| 6 | Reset real time counter |
| 7 | |
| 8 | |
| 9 | Read DPSK data |
| 10 | |
| 11 | |
| 12 | |
| 13 | |
| 14 | |
| 15 | |
| 16 | Read reg #1 |
| 17 | 2 |
| 18 | 3 |
| 19 | 4 |
| 20 | 5 |
| 21 | 6 |
| 22 | 7 |
| 23 | 8 |
| 24 | 9 |
| 25 | |
| 26 | Override antenna switch (LO) |
| 27 | Override antenna switch (HI) |
| 28 | |
| 29 | |
| 30 | |
| 31 | |

Comparator 16 has a second input of, for example, 12 bits from real time counter 24 over line 25. At times when the input on line 15 compares with the input on line 25, comparator 16 provides an ENABLE signal on line 26 to an input of instruction decoder 18 and a NEXT signal on line 27 to a control input of memory 12. Memory 12 functions in response to the NEXT signal to provide the next word in a predetermined sequence of words in memory 12 to comparator 16 on line 15.

An input signal on line 30 is coupled to an input of differential phase shift keyed (DPSK) decoder 31. DPSK decoder 31 functions to decode the input signal and to generate a synchronized clock with respect to the data decoded. The data is transferred over line 32 to an input of detector 33. The synchronized clock is coupled over line 34 to an input of detector 33. A reset signal is coupled over line 35 to an input of detector 33. Detector 33 functions to decode a 12 bit data signal which consists of a 5 bit barker code leading a 7 bit function identification code. When the 5 bit barker code is decoded a START signal is generated and coupled over line 36 to an input of real time counter 24. Real time counter 24 may, for example, be a 12 bit counter including a clock 37 which may, for example, be at 500 kHz which is coupled over line 38 to an input of real time counter 24. When detector 33 decodes, for example, the 7 bit data transferred over line 32, detector 33 will generate an interrupt signal which is coupled over line 39 to an input of central processing unit 40. The data identifying a particular function to be performed is coupled from detector 33 over line 41 to an input of central processing unit 40.

Central processing unit 40 functions to identify the data transferred over line 41 and to provide a 5 bit code over data bus 14 to an input of decoder 43. Decoder 43 functions to decode the 5 bit instruction to generate 32 possible instructions, which are implemented by control lines 44-46. Further, central processing unit 40 generates an ENABLE signal which is coupled over line 47 to an input of decoder 43 which enables decoder 43 to decode the 5 bit instruction when where transferred to it from the central processing unit. Table 2 provides one example of 32 instructions which central processing unit 40 may transfer to decoder 43. Control signals from decoder 43 are coupled to the respective functional blocks to permit implementation of the instructions. By this means central processor unit 40 may load memory 12 with event times and instructions corresponding to respective event times over data bus 14. Furthermore, decoder 43 may generate control signals to reset real time counter 24.

Real time data to be collected may, for example, be gathered on line 50 in analog form and converted to digital form by a/d converter 51 having an output coupled to data bus 52. Data bus 52 has an output coupled to register 53 which may, for example, contain nine 8 bit latches and to direct memory access controller 54.

Sensor data may be obtained from a sensor 55 including an antenna 56 which is coupled over line 57 to the input of RF section 58 which has an output coupled over line 59 to an intermediate frequency section 60 of a radio frequency or microwave receiver. The output of intermediate frequency section 60 is coupled over line 61 to an input of detector 62 having an output coupled to line 50. Other sensors may be coupled to line 50, such as sensors 63-65, each having an output coupled to line 50.

Register 53 which may, for example, store 9 words by 8 bits is coupled at its output port to bus 14. Direct memory access controller 54 has its data coupled to bus 14 over line 67 and a respective address coupled to bus 14 over line 68, which may be multiplexed to provide 8 bits at a time to bus 14. Direct memory access controller may have control signals from instruction decoder 18 over lines 20 and 20' to control the start and stop of the direct memory access. The direct memory access controller may provide a request signal to central processing unit 40 over line 69. Central processing unit 40 may provide a grant signal over line 70 to an input of direct memory access controller 54. Direct memory access controller 54 may provide a memory write control signal to central processing unit 40 over line 71. Direct memory access controller 54 may provide an address latch signal to central processing unit 40 over line 72.

Decoder 43 has control lines which are coupled to register 53 for accessing the data stored in register 53.

In areas of voluminous sequential data gathering such as scanning beam amplitude data from the scanning beam of the ground based unit, it is convenient to place the data within the central processing unit 40 in its random access memory 73. The direct memory access controller 54 places the next data into its memory data register 74 and the updated direct memory access address is placed into memory address register 75. The data in register 74 and its corresponding address in register 75 are multiplexed over bus 14 with the direct memory access controller providing control signals for the proper transfer of data to memory 73. The central processing unit 40 can establish a hard wired index so that the data can be placed in any desired region in memory 73. Direct memory access controller 54 supervises all the proper addressing and data transfers independently of instruction decoder 18 once a START DMA signal is transferred over line 20 to direct memory access controller 54. Direct memory access controller 54 is turned on and off during the real time operation by way of real time controller 10, via lines 20 and 20'. The real time controller 10 with its memory 12 provides a programmable event and associated instruction sequencer. The central processing unit 40 loads the memory 12 with the operation it wants it to perform with respect to the microwave landing system signal to be received. The real time controller 10 may accept, for example, 20 words in memory 12 and provide 16 different instructions by means of instruction decoder 18. Central processing unit 40 may access real time controller 10 for loading its memory 12, as well as accessing register 53 by means of decoder 43.

In operation, following a valid function identification code decode by detector 33, a START signal on line 36 causes the 12 bit real time counter 24 to track real time on the upcoming microwave landing system signal. At that point, the central processing unit 40 knows the type of function received by means of the data transferred on line 41 and proceeds to program or load memory 12 with those duties that need to be done in real time. The real time controller 10 is comprised of memory 12, a comparator 16 and an instruction decoder 18. Memory 12 is organized, for example, for 16 bit data with 12 bits for the time event and 4 bits for the instruction, with the capability of up to 20 words being stored. If a first in-first out memory is used, then words may be loaded in chronological order in memory 12. The comparator 16 compares the real time counter output to the next event time provided by memory 12. When a compare occurs, the corresponding 4 bit instruction of that event time is decoded by decoder 18 and the instruction is executed by means of control signals on lines 19-21. In addition, the next event time and instruction are pulled from memory 12 by the NEXT control signal on line 27. In order to inform the central processing unit 40 of when the real time controller 10 is finished with all of its instructions in memory 12, one of the instructions in memory 12, usually the last instruction, is a central processing unit INTERRUPT signal. The central processing unit 40 has the option of loading additional instructions into memory 12 or to just collect the data stored in register 53. Central processing unit 40 may also receive data from direct memory access controller 54. The real time controller 10 will disable itself when there are no more instructions in memory 12. Many of the real time duties previously performed by central processing unit 40 are off-loaded from central processing unit 40 which may include the resetting of two peak detectors necessary for tracking maximum amplitude in various time frames, the storage of the amplitude in a selected register, such as register 53, switching antenna selection or sensor selection for polling signal strength, latching DPSK data, turning the direct memory access (DMA) controller 54 on and off and the generating of interrupts to central processing unit 40 for additional instructions for memory 12.

A real time controller 10 has been described to operate in conjunction with central processing unit 40 for obtaining real time data from a plurality of sensors 55 and 63-65.

The invention claimed is:

1. Apparatus for obtaining real time data from a sensor comprising
    a central processing unit having an arithmetic unit, random access memory, program memory,
    first means for decoding an input signal containing time reference data and function data associated therewith and for generating a START signal in response to said time reference data,
    a real time counter coupled to said first means for receiving said START signal,
    a comparator having a first input coupled to said real time counter,
    a first memory having storage space for a plurality of words, each word having a predetermined number of bits, a first portion of said bits coupled to a second input of said comparator and a second portion of said bits coupled to an instruction decoder, said instruction decoder having a plurality of output lines,
    said comparator functioning to compare said first input from said real time counter to said second input from said first memory and to generate an ENABLE signal and a NEXT signal in response to a comparison, said ENABLE signal coupled to said instruction decoder to enable said decoder to decode the second portion of bits, said NEXT signal coupled to said first memory, said first memory responsive to said NEXT signal for accessing a predetermined word of said first memory,
    and means for loading said first memory in response to said function data.

2. The apparatus of claim 1 wherein said instruction decoder has a plurality of control signals coupled to respective storage means for storing data in response to a decoded instruction, at least one said storage means adapted for coupling to said sensor for obtaining said real time data.

3. The apparatus of claim 2 wherein said storage means includes a direct memory access controller for transferring data and an associated memory address to said random access memory of said central processing unit.

4. Apparatus for obtaining real time data from a sensor comprising
- a central processing unit having an arithmetic unit, random access memory, program memory
- first means for decoding an input signal containing time reference data and function data associated therewith and for generating a START signal in response to said time reference data,
- a real time counter coupled to said first means for receiving said START signal,
- a comparator having a first input coupled to said real time counter,
- a first memory having storage space for a plurality of words, each word having a predetermined number of bits, a first portion of said bits coupled to a second input of said comparator and a second portion of said bits coupled to a first instruction decoder, said first instruction decoder having a plurality of output lines,
- said comparator functioning to compare said first input from said real time counter to said second input from said first memory and to generate a first ENABLE signal and a NEXT signal in response to a comparison, said first ENABLE signal coupled to said first instruction decoder to enable said first instruction decoder to decode the second portion of bits, said NEXT signal coupled to said first memory, said first memory responsive to said NEXT signal for accessing a predetermined word of said first memory,
- a second instruction decoder responsive to instructions and a second ENABLE signal from said central processing unit for providing a plurality of control signals at times said second ENABLE signal is high, said control signals coupled to respective storage means for accessing the data stored therein and to said first memory for loading said first memory with words.

* * * * *